G. A. AND A. F. TRACHTE
TANK HEATER.
APPLICATION FILED MAY 19, 1919.
1,334,978.
Patented Mar. 30, 1920.
2 SHEETS—SHEET 1.
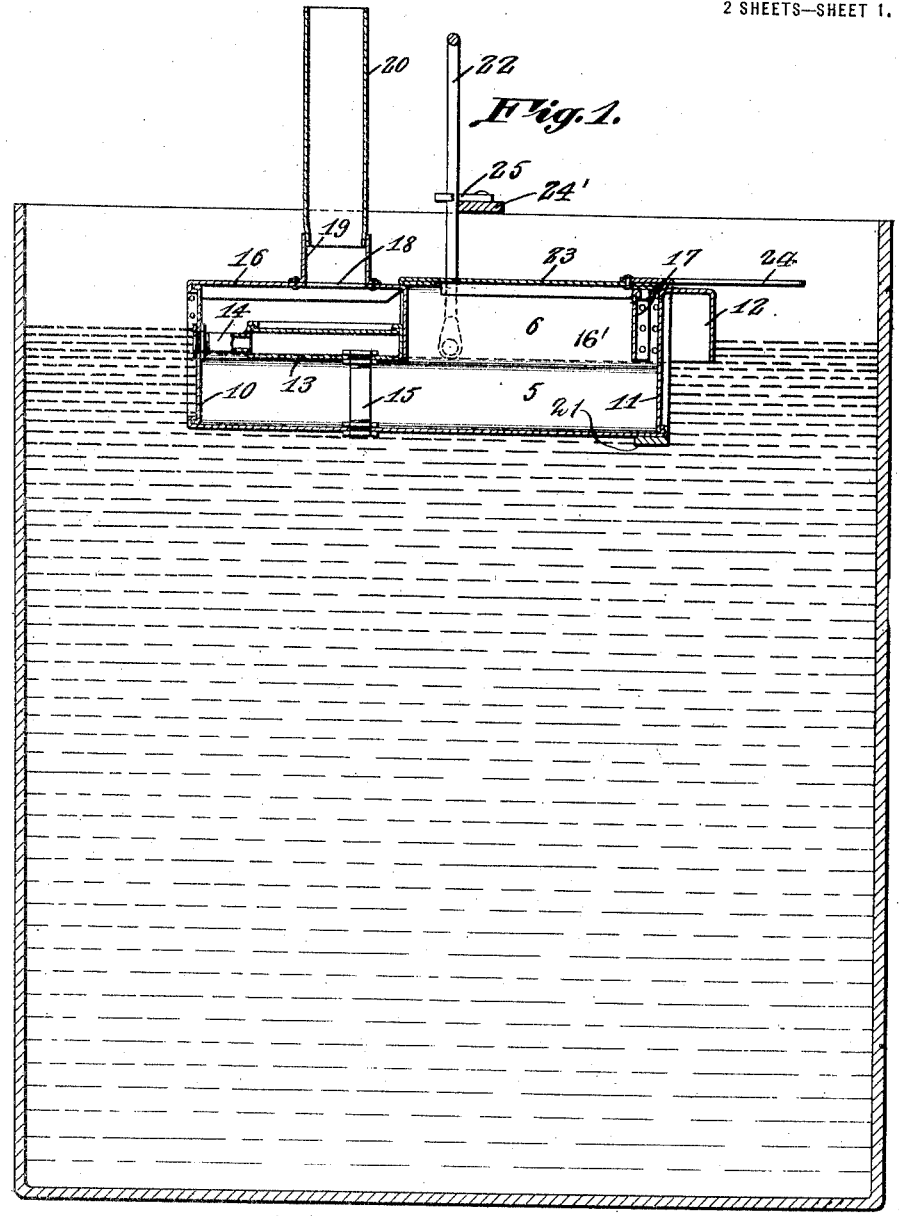
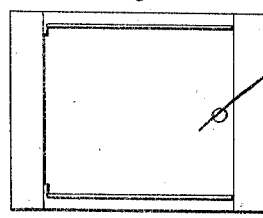
G. A. Trachte, Inventors
AND A. F. Trachte

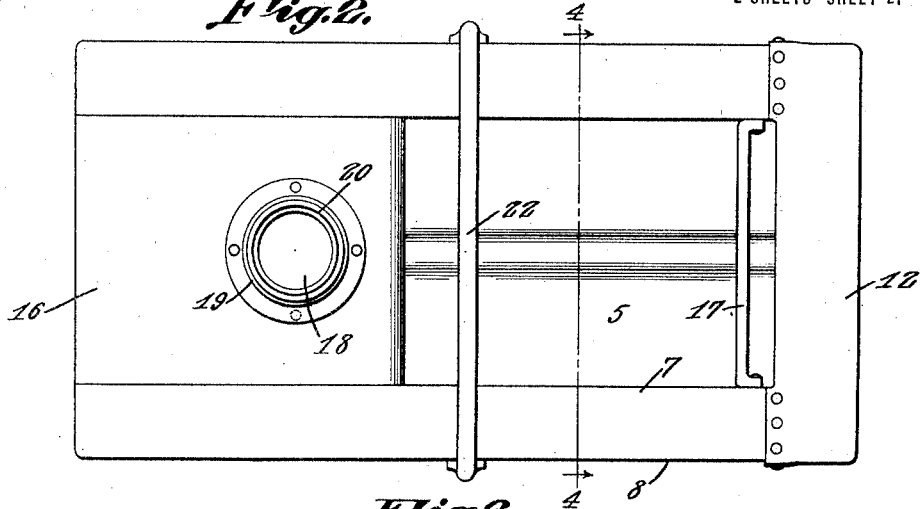
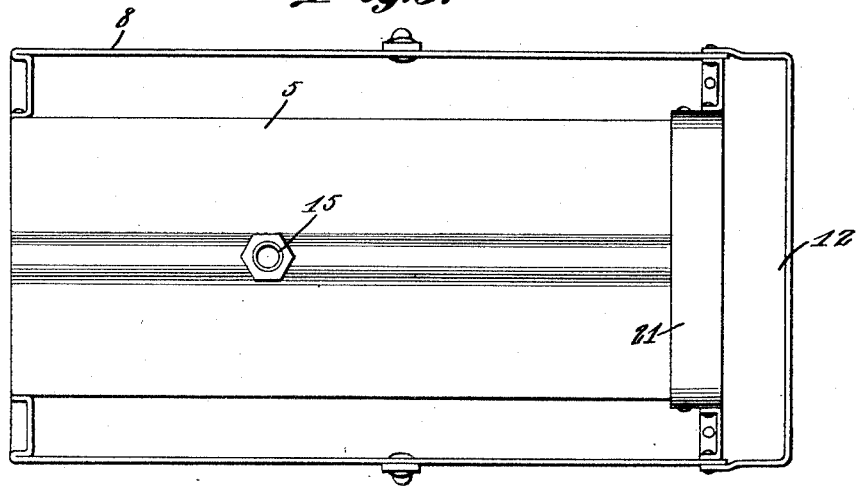
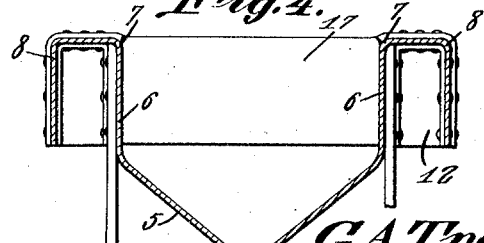

UNITED STATES PATENT OFFICE.

GEORGE A. TRACHTE AND ARTHUR F. TRACHTE, OF MADISON, WISCONSIN.

TANK-HEATER.

1,334,978.  Specification of Letters Patent.  Patented Mar. 30, 1920.

Application filed May 19, 1919. Serial No. 298,183.

*To all whom it may concern:*

Be it known that we, GEORGE A. TRACHTE and ARTHUR F. TRACHTE, citizens of the United States, residing at Madison, in the county of Dane, State of Wisconsin, have invented a new and useful Tank-Heater, of which the following is a specification.

The present invention relates to tank heaters, the principal object being to provide a tank heater which will heat the top surface of the water before the entire volume has been heated so that the heated water can be used immediately after the heater has been placed in operation.

A further object of the invention is to provide a tank heater which is removable from the tank and is adapted to have a fire built therein and the heater allowed to be partly submerged in the water in the tank.

Another object of the invention is the provision of a tank heater which will thoroughly heat the water in the tank and which will not be capable of capsizing in the tank.

A still further object of the invention is to provide a tank heater which is portable and is light enough to make the same easily handled and used in connection with any type of storage tank.

Another object of the invention is to provide a heater of the above described character which is simple in construction, which consists of few parts, and which may be manufactured and marketed at a minimum cost.

With the above and other objects and advantages in mind, the invention embodies combinations of elements, constructions, arrangements of parts, and operations, all of which will be hereinafter enlarged upon and illustrated in the accompanying drawings, the inventive features being strictly defined in the appended claims.

On the drawing, Figure 1 is a vertical, longitudinal, sectional view of a tank heater embodying our invention in position in the tank to be heated; Fig. 2 is a top plan of the same; Fig. 3 is a bottom plan of the heater; and, Fig. 4 is a transverse sectional view taken on line 4—4 of Fig. 2; and, Fig. 5 is a bottom plan view of the cover for the fire chamber.

Referring to the drawings in detail, wherein like characters of reference designate like parts in all the views, the numeral 5 designates a sheet of metal which is bent in V shape cross section to afford the bottom walls of the heater and has its opposite longitudinal edges extended vertically and in parallelism to constitute the side walls 6 of the heater. The metal thus forming the side walls 6 of the bottom wall 5 is bent at right-angles at 7 and extended reversely and then again bent at right-angles at 8 and extended downwardly thus affording balancing wings for balancing or stabilizing the heater while partly submerged in the water. An end wall 10 is crimped to the side walls and the bottom walls at their forward ends while an end wall 11 is also crimped to these walls 5 and 6 at their rear ends and is formed with the balancing or stabilizing member or wing 12 which is identical with the stabilizing members formed contiguous with the walls 6.

A horizontally disposed water-heating chamber 13 is mounted between the walls 6 adjacent the end wall 10 and is provided with a water inlet 15 and an outlet conduit 14. The balancing action afforded by the wings 8 and 12 is due to the formation of air chambers therein when the heater is partly submerged, the air being compressed between the water and the walls of the tank and wings.

A plate 16 is disposed over the water-heating chamber and is crimped to the end wall 10 and has its opposite longitudinal edges bent downwardly and engaged against the walls 6 while the inner end of the damper plate is bent at right-angles and extended downwardly and against the end of the water chamber 13. The fire chamber is designated at 16′ and extending thereacross adjacent the end plate 11 is a plate 17 between which and the plate 11 air passes to the fire. An opening 18 is formed in the plate 16 and a nipple 19 is secured to this plate at the edge of the opening, a pipe 20 being engaged with the nipple to conduct the gases and smoke from the fire chamber.

A U-shaped member 21 is secured to the side walls 6 at one end thereof and is adapted to support the heater on the bottom thereof when the same is not in the tank. A bail 22 is pivotally mounted on the side of the heater by means of which the device may be carried from place to place.

A cover or closure for the chamber 16′ is denoted by the numeral 23 and has inturned parallel flanges formed at its opposite edges which lie against the side walls 6 when the cover is in position. A handle 24 is secured to the cover. This cover may be slid back and forth to cover the draft opening between the end plate 11 and the plate 17.

When the device is used a fire is made in the chamber 16' and the device placed in the tank as illustrated in Fig. 1. The water circulating through the water heating chamber rising in the pipe 15 and passing out through the pipe 14 being thereby thoroughly heated and thence escaping by way of the outlet conduit and allowed to flow over the surface of the water.

A cross bar 24' extends across the upper end of the tank and has a hook 25 pivoted thereto which is engageable with the bail 22 of the heater, the function of the hook 25 being to prevent the heater from floating around in the tank but which will allow the tank to rise and fall with the water.

While the invention herein shown and illustrated is considered the preferred construction, it is to be understood that the same may be modified in many respects, and that our limits of such modification are governed only by what is claimed.

What is claimed is:—

1. The combination with a watering tank; of a cross member mounted at the top of the tank, a hook projecting from the cross member, a heater adapted to be partly submerged in the water, and a bail connected intermediately to the heater and engageable between the cross member and hook.

2. A tank heater adapted to be placed in a tank of water including a shell having a V-shaped cross section bottom and parallel side walls connected therewith, end walls connected to the bottom and side walls, a water heating chamber mounted in the casing at one end and secured to the side walls thereof and having a vertical water inlet which communicates with the water in the tank at the bottom of the latter and further provided with a water outlet above said inlet and extending horizontally to the water, the interior of the shell constituting a fire chamber, and a bail secured to the side walls of the shell.

3. In a heater adapted to be placed in a tank of liquid, a shell having a fire chamber therein, a water heating chamber supported adjacent the fire chamber and having a water inlet and an outlet, outwardly and downwardly turned flanges at the top of the shell forming balancing members, said heater and flanges when partly submerged in the liquid, serving to compress the air beneath said flanges whereby to stabilize the heater, and a bail secured to the shell.

4. In a tank heater, a shell including a bottom wall of V-shaped formation having side walls formed contiguous therewith, end walls connected with the bottom and side walls, the interior of the shell constituting a fire chamber, a water heating chamber supported in spaced relation to the bottom in the shell in a position to be heated, a water inlet for the water heating chamber communicating with the water contained in the tank and also provided with a water outlet, a damper plate mounted upon the shell for regulating the supply of air to the fire chamber, and a handle fixed to the plate.

5. A tank heater, including a sheet of metal bent to provide a bottom wall and side walls, the metal being bent at its longitudinal edges and extended laterally and bent downwardly and at right angles to provide balancing members, end walls connected with the side and bottom walls, the rear end wall being bent at its upper longitudinal edge and extended laterally, said edge being inturned at right-angles and extended downwardly to afford a third balancing member, a substantially rectangular water heating chamber supported in the shell adjacent one end thereof and provided with a water inlet and a water outlet, a plate disposed over the water heating chamber and having an opening therein for the passage of the products of combustion, the bottom wall constituting a fire chamber, and a bail pivotally connected with the side walls.

6. A heater of the character described, a shell having a fire chamber at one end thereof, a closure for the fire chamber, a water-heating chamber at the opposite end of the shell and having an inlet and an outlet, a damper plate secured to the edges of the shell and overlying the water heating chamber and having an opening therein to permit the passage of the products of combustion therethrough, and a bail carried by the shell.

7. A tank heater comprising a water-tight shell having upper edge portions thereof bent outwardly and downwardly to provide balancing chambers adapted when the heater is partly submerged to cause compression of the air therein, a water heating chamber at one end of the shell and supported in spaced relation to the bottom thereof, a heating chamber at the bottom of the shell and having an outlet for products of combustion, and means to hold the shell in a fixed position relative to the tank.

In testimony that we claim the foregoing as our own, we have hereto affixed our signatures in the presence of two witnesses.

GEORGE A. TRACHTE.
ARTHUR F. TRACHTE.

Witnesses:
J. J. McManamy,
Catherine Kalrath.